Patented Sept. 20, 1927.

1,642,774

UNITED STATES PATENT OFFICE.

JOHN DOUGLASS GRANGE, OF BROOKFIELD, ILLINOIS, ASSIGNOR TO WESTERN ELECTRIC COMPANY, INCORPORATED, OF NEW YORK, N. Y., A CORPORATION OF NEW YORK.

MARKED ARTICLE AND PROCESS OF MARKING ARTICLES.

No Drawing.   Application filed August 31, 1923. Serial No. 660,430.

This application relates to marked articles and a process of marking articles, but more particularly to a process of marking articles having a chemically active surface. Tracings from which blueprints are printed are usually made on cloth which has been coated with a solution of starch to form a transparent sheet, generally known as "tracing cloth." In some instances certain portions of drawings, such as borders, titles, standard notes and the like may be repeated on a great many drawings. In such cases it is desirable and economical to print these items upon the tracing cloth by means of a stamp, or otherwise, instead of outlining them in the usual manner with pen and ink. However, the printing with a stamp, using an ordinary ink, does not produce permanent markings, since in that case the ink does not penetrate into the sheet to an appreciable extent, as in the case where the pen is used, since the pen forces the ink materially into the sheet.

An object of the present invention is to mark a chemically active surface by applying thereto a substance which will react therewith.

The invention is based upon the property of certain chemical elements or compounds to react with certain others to produce or liberate a colored substance which may be used to produce markings upon a surface.

In accordance with one embodiment of the invention, a substance containing iodine may be applied to a surface containing a carbohydrate, such as starch, the reaction of the iodine with the starch producing a permanent marking which is incorporated with the surface material.

The following formula represents a composition which may be used upon a starch covered tracing cloth to produce markings by means of the above mentioned reaction.

| Material. | Grade. | Percentage by weight. |
|---|---|---|
| Water | Well | 78.1 |
| Potassium iodide | U.S.P. | 7.9 |
| Iodine (crystal) | U.S.P. | 7.1 |
| Phenol | U.S.P. | 6.9 |
|  |  | 100.0 |

In preparing the composition the potassium iodide is dissolved in warm water and the iodine is added. The phenol is added when the iodine is nearly dissolved, considerable stirring being required to obtain a saturated solution. The fluid is then decanted or separated from any undissolved iodine and is ready for use.

When such a solution is used for stamping characters or producing other markings upon a surface containing starch, as in the case of ordinary tracing cloth, it may be applied to the surface by means of an ordinary rubber stamp and the iodine reacts with the starch of the tracing cloth in the well known manner to produce colored markings. Although this reaction when complete usually produces a blue-black marking, in some cases the resulting markings are of a deep reddish brown, owing to a lack of sufficient moisture to complete the reaction, or to other causes. However, such a color is substantially as resistive as black to the light used in printing on a sensitized surface in producing blueprints. The phenol in the above described composition tends to make the marking produced by the reaction of the iodine with the starch in the tracing cloth darker in color and more permanent in character and also has the additional property of maintaining stamp pads which are treated with the composition moist.

This is in no sense a surface ink, the color being produced by the reaction of the active material applied to a surface with the active material of the surface, and in practice it is found to penetrate into the very cloth itself.

It is apparent that the scope of the invention is not restricted to the particular use herein set forth, but may be used wherever it is desired to produce permanent markings upon a chemically active surface.

What is claimed is:

1. A process of marking articles consisting in stamping iodine in solution upon a dry surface containing starch to produce a predetermined design thereon.

2. A process of marking articles consisting in applying iodine dissolved in potassium iodide to a stamp and transferring the iodine from the stamp to a dry surface containing carbohydrate capable of reacting with iodine to form a colored substance to produce a predetermined design by the reaction of the iodine and the carbohydrate.

8. A process of marking articles, consisting in applying a solution of iodine in potassium iodide and phenol to a dry surface, said surface containing starch, to produce a predetermined design by the reaction of the iodine and the starch.

In witness whereof, I hereunto subscribe my name this 22nd day of August, A. D., 1923.

JOHN DOUGLASS GRANGE.